US012373815B2

(12) United States Patent
Al-Rashidi

(10) Patent No.: US 12,373,815 B2
(45) Date of Patent: *Jul. 29, 2025

(54) SYSTEMS AND METHODS FOR SECURE COMMUNICATIONS UTILIZING GATEWAY SERVERS

(71) Applicant: One Global Service for General Trading LLC, Kuwait (KW)

(72) Inventor: Mohammed Sh. Al-Rashidi, Kuwait (KW)

(73) Assignee: One Global Service for General Trading LLC, Kuwait (KW)

( * ) Notice: Subject to any disclaimer, the term of this patent is extended or adjusted under 35 U.S.C. 154(b) by 1080 days.

This patent is subject to a terminal disclaimer.

(21) Appl. No.: 17/070,860

(22) Filed: Oct. 14, 2020

(65) Prior Publication Data

US 2021/0027272 A1 Jan. 28, 2021

Related U.S. Application Data

(63) Continuation of application No. 14/822,734, filed on Aug. 10, 2015, now Pat. No. 10,810,573, which is a (Continued)

(51) Int. Cl.
*G06Q 20/32* (2012.01)
*G06Q 20/02* (2012.01)
(Continued)

(52) U.S. Cl.
CPC ....... *G06Q 20/3227* (2013.01); *G06Q 20/027* (2013.01); *G06Q 20/202* (2013.01);
(Continued)

(58) Field of Classification Search
CPC ............................................ G06Q 20/20–209
See application file for complete search history.

(56) References Cited

U.S. PATENT DOCUMENTS 9,129,276 B1 * 9/2015 Fasoli ................. G06Q 20/203
9,189,778 B1   11/2015 Sh. Al-Rashidi
(Continued)

FOREIGN PATENT DOCUMENTS

WO   WO2009136404   11/2009
WO   WO2015183999   12/2015

OTHER PUBLICATIONS

International Search Report and Written Opinion mailed Aug. 25, 2015 in Patent Cooperation Treaty Application No. PCT/US2015/032735, 12 pages.

*Primary Examiner* — Jay Huang
(74) *Attorney, Agent, or Firm* — Carr & Ferrell LLP

(57) ABSTRACT

Methods and systems for conducting a secure transaction over a network using one or more gateway servers. The methods include receiving a request from a consumer, sending the request to a merchant, and receiving, from the merchant, a payment order associated with the request. The payment order is received via a merchant programmable user interface. The methods also include confirming the payment order to transform the payment order to a confirmed payment order, sending the confirmed payment order to a user, and receiving, from the user, a payment authorization associated with the confirmed payment order, and the payment authorization being received via a consumer programmable user interface. The payment authorization from the user includes a secure, encrypted, Internet Protocol (IP) message using encryption hashed with public and private key management. The methods also include performing a transaction in accordance with the payment authorization.

19 Claims, 6 Drawing Sheets

Related U.S. Application Data continuation of application No. 14/723,316, filed on May 27, 2015, now Pat. No. 9,189,778.

(60) Provisional application No. 62/004,091, filed on May 28, 2014.

(51) Int. Cl.
  *G06Q 20/20* (2012.01)
  *G06Q 20/36* (2012.01)
  *G06Q 20/38* (2012.01)
  *G06Q 20/40* (2012.01)
  *G06Q 20/42* (2012.01)

(52) U.S. Cl.
  CPC ..... *G06Q 20/3278* (2013.01); *G06Q 20/3674* (2013.01); *G06Q 20/382* (2013.01); *G06Q 20/401* (2013.01); *G06Q 20/42* (2013.01); *G06Q 2220/00* (2013.01)

(56) References Cited

U.S. PATENT DOCUMENTS

| | | |
|---|---|---|
| 10,296,887 B2 * | 5/2019 | Kingsborough ... G06Q 30/0236 |
| 10,810,573 B2 | 10/2020 | Sh. Al-Rashidi |
| 2005/0187873 A1 | 8/2005 | Labrou et al. |
| 2007/0022058 A1 * | 1/2007 | Labrou ............... G06Q 20/322 |
| | | 705/67 |
| 2011/0119121 A1 | 5/2011 | Sosikian |
| 2012/0016731 A1 | 1/2012 | Smith et al. |
| 2012/0166344 A1 | 6/2012 | Cheng et al. |
| 2012/0191522 A1 | 7/2012 | McLaughlin et al. |
| 2012/0284175 A1 | 11/2012 | Wilson et al. |
| 2013/0256403 A1 | 10/2013 | MacKinnon |
| 2013/0275308 A1 | 10/2013 | Paraskeva et al. |
| 2015/0032612 A1 | 1/2015 | Signarsson et al. |
| 2015/0348010 A1 | 12/2015 | Sh. Al-Rashidi |
| 2015/0348031 A1 | 12/2015 | Sh. Al-Rashidi |
| 2016/0005043 A1 * | 1/2016 | Goldstone ............ G06Q 20/108 |
| | | 705/44 |
| 2023/0196328 A1 * | 6/2023 | Xiu ................... G06Q 20/3274 |
| | | 705/16 |

* cited by examiner

SYSTEMS AND METHODS FOR SECURE COMMUNICATIONS UTILIZING GATEWAY SERVERS

CROSS-REFERENCE TO RELATED APPLICATION

This application is a continuation of U.S. Non-Provisional patent application Ser. No. 14/822,734, filed Aug. 10, 2015, which is a continuation of U.S. Non-Provisional patent application Ser. No. 14/723,316, filed May 27, 2015, which claims the benefit of U.S. Provisional Patent Application Ser. No. 62/004,091, filed May 28, 2014, all of which are entirely incorporated herein by reference for all purposes.

FIELD OF INVENTION

The present invention relates to payments. In particular, the present technology provides a switch server system interoperable with mobile devices for providing secure communications.

BACKGROUND

The use of currency (cash) has been rapidly decreasing, as consumers and merchants rely increasingly on credit and debit accounts. Further, mobile phones, tablets, and/or laptops are increasingly prevalent. Mobile phones have been used for payments, though typically they require special chips, for instance Near Field Communication (NFC) chips. Merchants are using mobile devices to accept payments, though likewise these systems require special hardware, for instance card readers.

SUMMARY

Some embodiments of the present technology include a computer-implemented method for conducting a secure transaction over a network using one or more gateway servers. Embodiments of the method include receiving a request from a consumer, sending the request to a merchant, and receiving, from the merchant, a payment order associated with the request. The payment order is received via a merchant programmable user interface. Embodiments of the method also include confirming the payment order to transform the payment order to a confirmed payment order, sending the confirmed payment order to a consumer, and receiving, from the consumer, a payment authorization associated with the confirmed payment order, and the payment authorization is received via a consumer programmable user interface. The payment authorization from the consumer includes a secure, encrypted, Internet Protocol (IP) message using encryption hashed with public and private key management. Embodiments of the method also include performing a transaction in accordance with the payment authorization.

Various embodiments of the method include sending a registration message to the merchant, receiving, from the merchant, identifying information associated with the merchant in response to the registration message, and validating the identifying information. Embodiments of the method also include sending a validation message associated with the validating of the identifying information to a payment service provider (PSP).

Some embodiments of the present technology include performing of the transaction in accordance with the payment authorization being associated the PSP, the PSP being at least one of: an internal consumer wallet account, a direct bank transfer account, and a third-party PSP.

Various embodiments of the present technology include the PSP being an internal consumer wallet account.

Some embodiments of the present technology include performing of the transaction being in accordance with the payment authorization, using a secure internal switch, and being associated with the internal consumer wallet account. The internal consumer wallet account being associated with an account of the consumer. The account of the consumer being at least one of: a credit account, a debit account, a savings account, a loyalty account, and a virtual currency account.

Various embodiments of the present technology include sending, to the consumer, the merchant, and the consumer one or more payment confirmations associated with the performing of the transaction in accordance with the payment authorization.

Some embodiments of the present technology include the merchant programmable user interface being coupled with a mobile Points Of Sale (mPOS) terminal, the merchant programmable user interface configured to perform at least one of: registering the terminal, managing the terminal, and authorizing a payment from the PSP to the merchant. Embodiments of the method include the merchant programmable user interface also configured to perform at least one of: preauthorizing the payment from the PSP, voiding the payment from the PSP, refunding the payment from the PSP, and settling the payment from the PSP.

Various embodiments of the present technology include the merchant programmable user interface being configured to perform at least one of: managing a profile of the merchant, managing a definition of a product, managing an inventory of the product, managing a location of the product, managing agents of the merchant; and contacting a support system about the merchant.

Some embodiments of the present technology include the merchant programmable user interface being configured to perform at least one of: communicating with a product catalog of the merchant, communicating with an inventory system of the merchant, communicating with a product information management system of the merchant, and updating inventory of the merchant based on the request.

Various embodiments of the present technology include the merchant programmable user interface being configured to perform at least one of: communicating with a third-party product catalog, communicating with a third-party inventory system, and communicating with a third-party product information management system.

DETAILED DESCRIPTION

Figure 1:
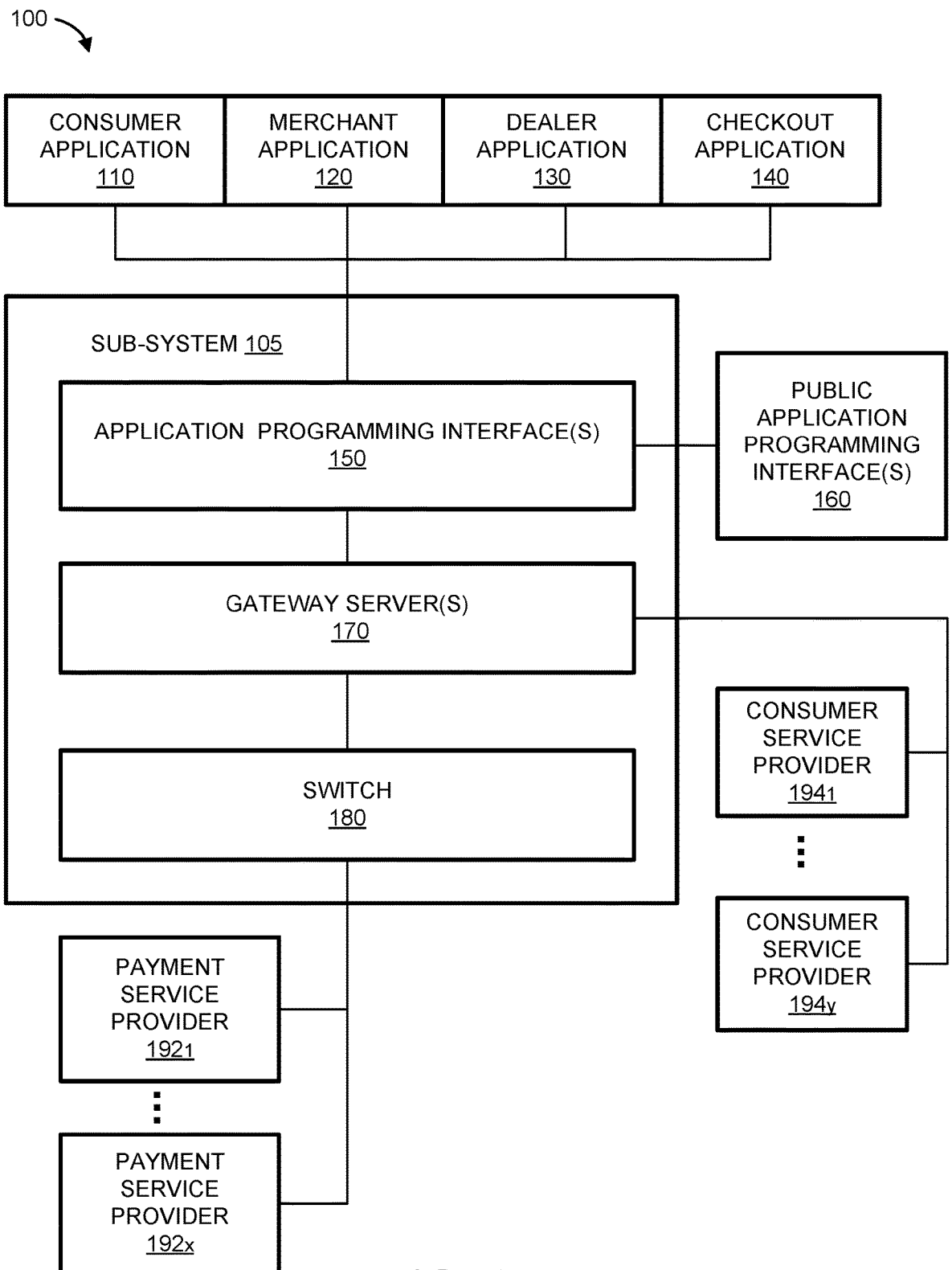
FIG. 1 is a simplified block diagram of a system according to exemplary embodiments of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Embodiments of the present technology provide a convenient, secure, cost-effective, and unified payment solution. The solution is designed to reduce the cost traditionally incurred by merchants, facilitate easier and faster consumer acquisition by dynamically extending the payment options to consumers and merchants. The channels by which consumers and merchants can interact with Payment Orders (Payit Coins (Wallet)) and provide an IP cryptography-based secure payment method works seamlessly for both card-present and card-not-present scenarios.

In the past, there have been numerous alternative solutions to card-not-present payment methods (e.g. using e-Wallets, and physical agents). However there have been no major alternatives to traditional card-present methods. Recently, several NFC- and QR-based alternatives have emerged (e.g. Apple Pay, VISA Paywave, MasterCard PayPass, AMEX ExpressPay). Yet, these alternatives have restrictions including that they are targeted with limited set of devices (e.g. NFC-enabled), still rely on traditional infrastructure (e.g. costly brands network), and follow the same traditional flow between payment card/payment application and Point of Sale Terminal/NFC-enabled Point of Sale Terminal.

Recently-emerging solutions only work with a limited set of consumer devices (e.g. phones with NFC support), require sophisticated setup at the merchant side (e.g. NFC Paywave certified POS terminals), and still rely on the existing payment network infrastructure (e.g. costly brands network). Furthermore, they do not provide any unified approach for card-present and card-not-present scenarios.

In various embodiments, Payit Orders work for both card-present and card-not-present scenarios. The solution allows to extend the payment options available to the consumer and to dynamically transform the payment scenario from a card-present to a card-not-present scenario and vise-versa.

According to various embodiments of the present technology, a solution is provided by Payit Orders and the Payit Cloud Platform. A Payit Order is a signed and encrypted cryptographic payment order payload that is typically sent securely from the merchant mobile application to the Consumer mobile application through the Payit Cloud Platform (namely, Payit Gateway). Merchants' identities are initially verified through a Know-your-customer (KYC) process, which consequently allows their orders to be signed with (their private keys) and encrypted. A Consumer goes through a verification process, after which his/her e-Wallet becomes associated with the mobile device (e.g. EMEI and Phone Number). This allows consumer requests (e.g. order acceptance request) to be signed and sent securely. In various embodiments, Payit Orders supports multiple use cases, including electronic payments for m-commerce transactions, money transfers, and electronic payments from 3rd-party e-commerce applications (via Payit Checkout). In this manner, the system provides a unique alternative to in-store card-present payments.

According to various embodiments of the present technology, the following points describe the sale process. The merchant keys in the required amount and the account Id of the consumer (e.g. phone number) into the Payit merchant app, which in turn, creates a Payit order cryptogram using the merchants private key. The cryptogram is then submitted to Payit Gateway (the Payit Cloud Platform). Payit Gateway decrypts the cryptogram and validates the merchant. Payit Gateway pushes a signed order to the consumer's mobile application, which decrypts the order, and prompts the consumer to accept it. The consumer selects the payment method he/she wants to use for payment (by default, Payit Coins (Wallet)). A signed request is sent from the consumer application to the Payit Gateway, which in turn, validates the request and forwards it to Payit Switch for processing. The payment order is processed by Payit switch; i.e. the consumer wallet is debited, and the merchant wallet is credited in one atomic transaction. The result is returned to Payit Gateway. Payit Gateway sends a "successful payment" confirmation to the consumer, and sends a "successful payment" confirmation to the merchant. The merchant can then submit an invoice to Payit at any later stage.

In various embodiments, Payit Orders can be passed through different merchant channels, be accessed through different consumer channels, and eventually be routed to different payment channels. In other words, it extends the number of payment methods available to the consumer, and transforms the payment scenario from card-present to card-not-present and vise versa. The following illustrates the various channels. Payit orders may be submitted to Payit Gateway from a Payit Merchant mobile application, from a 3rd-party e-Commerce Site through Payit Checkout, or from a 3rd-party service provider app through APIs.

According to various embodiments of the present technology, Merchants go through an acquiring and KYC process, and consumers go through a verification process after which their unique identifications (mobiles number, email or ID) are associated to their accounts. Both parties become known to Payit, which allows the Payit Gateway to facilitate the entire payment process in a closed loop manner, without depending on other parties (banks, schemes, etc.). The solution enables a relatively fast and easy consumer acquisition. The payment order flow is different from other solutions. The Payit order cryptogram is initiated by merchant and flows to the consumer, who in turn, decides to pay using the payment methods available to him. In other words, the consumer is in control of the payment process, and the consumer doesn't need to share any payment choice with merchant. The solution does not require sophisticated consumer devices (e.g. smart phone with NFC support). It can work with basic phones using SMS. Payit Orders can be initiated and submitted through different channels; e.g. merchant mobile app, 3rd-party e-Commerce sites (via Payit Checkout), and through other API-integrated systems. Payit Orders can be processed in different ways; using smart phones, basic phones, and through Payit dealers (in which case, they can pay for an item or service, even if they don't have their mobile device with them). The present technology extends a payment solution to cover whole consumer segment levels, from banked to unbanked, from smartphones to feature phones and even to non-mobile subscribers. All parties can buy and shop within Payment Order cryptography-IP.

In various embodiments, the present technology specializes in a number of diverse business domains, including Value Added Services (VAS), Mobile Money, Mobile payment, Money Transfer, Mobile banking, Mobile health care, retail, VOIP, m-Commerce; and works with different stakeholders, including banks, payment service providers, telcos, service providers, retailer, etc.

In various embodiments of the present technology, a computer-implemented method for conducting a secure transaction over a network using one or more gateway servers, the method includes generating, with a processor, the payment order by encoding changes to the values of the request from the consumer, storing the payment order in a first memory location, receiving the payment authorization and storing the payment authorization in a second memory location, comparing, with a processor, the payment authorization with the payment order, and converting the payment authorization into a secure transaction authorization.

In some embodiments, the present technology provides a mobile application that may be downloaded to a mobile device. A consumer or merchant registers with a central system to activate an account. The consumer may then fund the account from one or more sources, for instance a credit account, a debit account (also referred to as a checking account), a savings account, loyalty accounts, a virtual currency or any other appropriate currency account. The consumer may link the one or more accounts and may institute an automatic replenishment (also referred to as a top-off) order. The authentication process may include associating a mobile number, consumer name, email, account information, and any other identifying information. A password may be provided or selected, and an activation code may be sent via Short Message System (SMS) text message to the mobile device to ensure correct association.

In various embodiments, a consumer or merchant then chooses to pay a bill using the mobile application. For example, a consumer may indicate to a merchant a desire to pay a bill with the present application (also referred to as "Payit" or the "Payit application"), and may identify themselves to the merchant using their mobile phone number. The merchant may have the Payit application downloaded to a mobile device, at a cash register, on a tablet, or may quickly download the Payit application to any of these devices, or any other appropriate device. Using the Payit application, the merchant may send a secure, encrypted Internet Protocol (IP) message to the consumer based on the Payit identifier of the consumer. The secure, encrypted IP message may be hashed using a public and private key management system to ensure utmost security and privacy. The encrypted IP message includes a payment order. The consumer then opens the Payit application, sees the payment order in a list of payment orders, and authorizes the payment. The authorization may be a secure, encrypted IP message sent to the merchant and indicates payment. The merchant and consumer have records in their respective accounts in the Payit application of all payment orders, both received and unpaid, and paid. Alternatively, the consumer may choose to reject or not pay any payment order, thus ensuring consumer confidence in the Payit application.

According to some embodiments, the consumer or merchant chooses to pay monthly or other periodic bills using the Payit application. By linking certain service providers, for example, phone, internet, utility or other monthly (or other periodic, or non-periodic) bills, with the Payit application, the consumer may consolidate all billing in a central location and may reduce transaction costs and bookkeeping obligations. The consumer may also choose to share certain information from the Payit application to other contacts, either from the Payit application or from another address book application, or via a social media application.

According to various embodiments, the consumer or merchant uses the Payit application to shop for goods and services by searching for an item or a merchant in the Payit application, and selecting goods or services for purchase. The merchant may receive the order from the consumer in the Payit application, and then may send a secure, encrypted IP message to the consumer via the Payit application including a payment order. The consumer may receive the payment order and authorize it, causing the Payit application to send a secure, encrypted IP message to the merchant. The merchant then fulfills the order.

In exemplary embodiments, merchants use the Payit application to receive payments from a consumer, make payments to suppliers, and maintain inventory. Merchants may link inventory and orders from suppliers so that when inventory drops below a predetermined, selectable threshold, a new order to a supplier is made, and payment may be made.

According to some embodiments, the system may operate in a cloud-based computer environment or, alternatively, may operate as a secure server. All communications to and from mobile devices and other mobile applications may be encrypted and decrypted for security purposes.

According to various embodiments, the Payit application may be a mobile application, and/or may be used on a laptop, smartphone or PDA, wearable device, and may be downloadable or web-based. Alternatively, the system may be implemented in software and/or hardware. A mobile application may be provided that enables a consumer to access a web-based version of the system from a mobile device.

FIG. 1 is a simplified block diagram of a system 100 according to exemplary embodiments of the present technology. The architecture comprises a server system that is configured to provide various functionalities, which are described in greater detail throughout this document. Generally the system 100 is configured to communicate with client devices. Client devices may include, for example, a Smartphone, a laptop, a computer, or other similar computing device. An example of a computing device that can be utilized in accordance with the present technology is described in greater detail with respect to FIG. 5.

The system 100 may communicatively couple with clients via a public or private network. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection, and the like. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network, and the like. A network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking, and the like.

The system 100 in FIG. 1 generally comprises consumer application 110, merchant application 120, dealer application 130 and checkout application 140. The system 100 further includes application programming interface(s) 150, public application programming interface(s) 160, gateway server(s) 170, and switch 180. Application programming interface(s) 150, gateway server(s) 170, and switch 180 form sub-system 105, which may also be referred to as the internal Payit system. Consumer application 110, merchant application 120, dealer application 130 and checkout application 140 may communicate bilaterally with gateway server(s) 170 via application programming interface(s) 150. System 100 also includes payment service providers (PSPs) 192$_1$-192$_x$ and consumer service providers (CSPs) 194$_1$-194$_y$. Payment service providers (PSPs) 192$_1$-192$_x$ may communicate bilaterally with gateway server(s) 170 via switch 180. Consumer service providers (CSPs) 194$_1$-194$_y$ may bilaterally communicate directly with gateway server(s) 170. Consumer service providers (CSPs) 194$_1$-194$_y$ may include the merchant, service providers operating on behalf of the merchant, and/or third party retailers working in partnership with, or appearing in a catalog of, the merchant.

Figure 2:
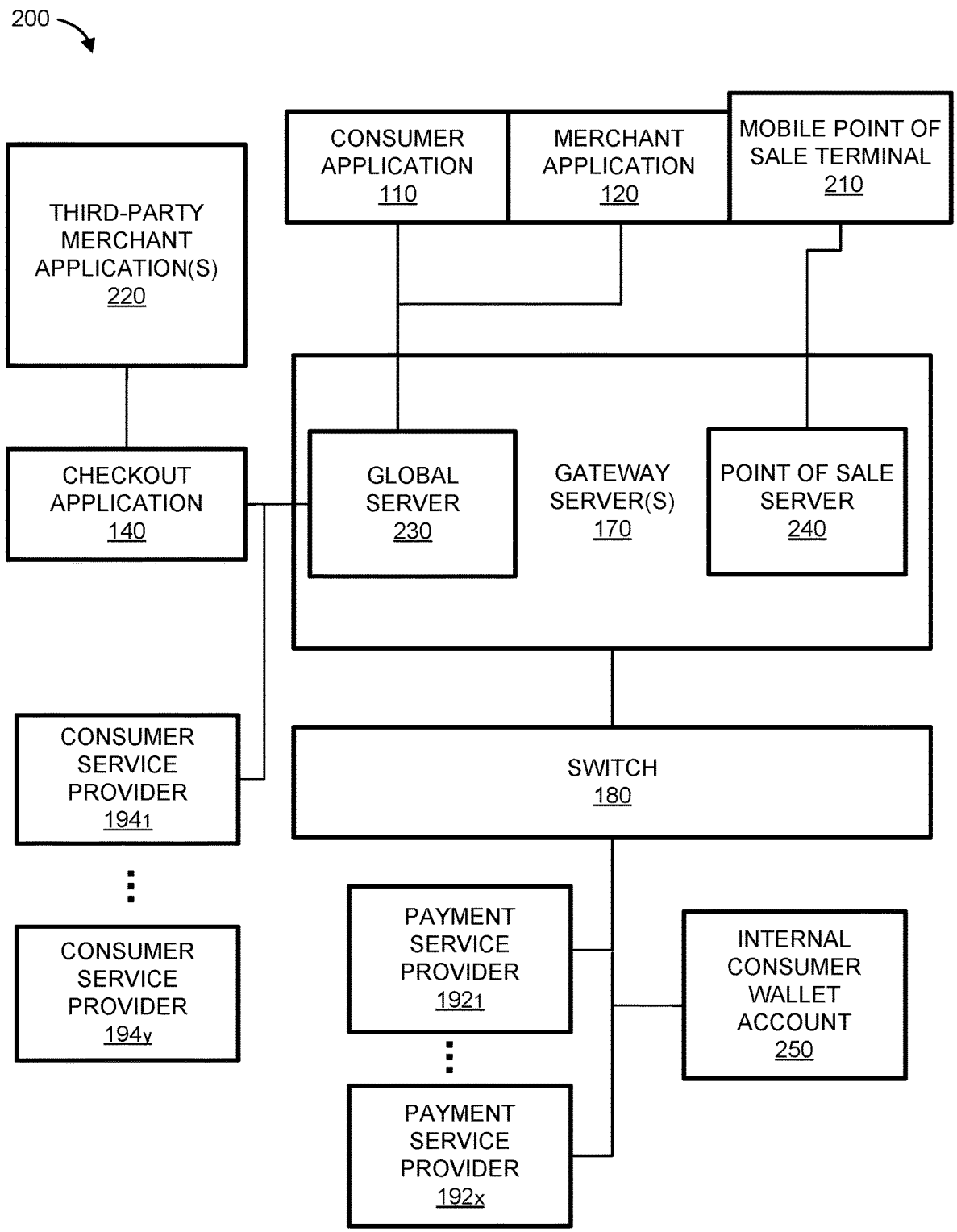
FIG. 2 is a simplified block diagram of a system according to exemplary embodiments of the present technology.

FIG. 2 is a simplified block diagram of a system 200 according to exemplary embodiments of the present technology. The system 200 in FIG. 2 includes the consumer application 110, the merchant application 120, mobile Point of Sale (mPOS) terminal 210, the checkout application 140, and third-party merchant application(s) 220. The system 200 further includes the gateway server(s) 170 with global server 230 and point of sale server 240. The system 200 also includes the consumer service providers (CSPs) 194$_1$-194$_y$, the switch 180, the payment service providers (PSPs) 192$_1$-192$_x$, and internal consumer wallet account 250. In various embodiments, the internal consumer wallet account 250 may be an account of the consumer or an account of the consumer (e.g. a third-party).

In various embodiments, the switch 180 adds additional security to messages sent within the system 100 and system 200 by signing, authenticating, and applying business rules to the messages during the routing process. For example, a MyOrders cryptographic message is signed with a public and a private key. In addition to hashing, Secure Socket Layer (SSL) encryption and key store exchange occurs between systems within a merchant and consumer data flow. The switch 180 maintains extra signing and login/handshake authentication that may involve account parameters for achieving a purchase transaction. For instance, when a merchant pushes an order through the gateway server(s) 170, the switch 180 routes the order to a consumer system by applying business rules linked to the order itself. The switch 180 routes the order to a consumer system by applying business rules linked to the order itself, whether the order is within a Payit Network, to a third-party system, and/or issued by a third-party party merchant. Thus, the switch 180 applies signing, authentication, and business rules to orders during the routing process, which is managed via a fraud control policy, risk management, and end-to-end business rules. In contrast, a normal switch has known standards and authentication that can be compromised when an IP packet data is transported from one system to another.

According to various embodiments, a closed loop transaction operates within a Payit network with a set of cryptography parameters that are shared between modules, making every purchase and payment operate seamlessly within the data flow. When an open loop transaction is initiated for routing an order, or a third-party system requests to submit orders, then IP packets receive extra parameters to ensure that the outside system is authorized to communicate with the Payit network through the switch 180. For example, signing with keys, authentication, and application of business rules, are all maintained and enforced by the switch for each IP cryptography packet to ensure that a transaction is genuine before processing it with the Payit network (e.g. system 100 or system 200).

Figure 3A:
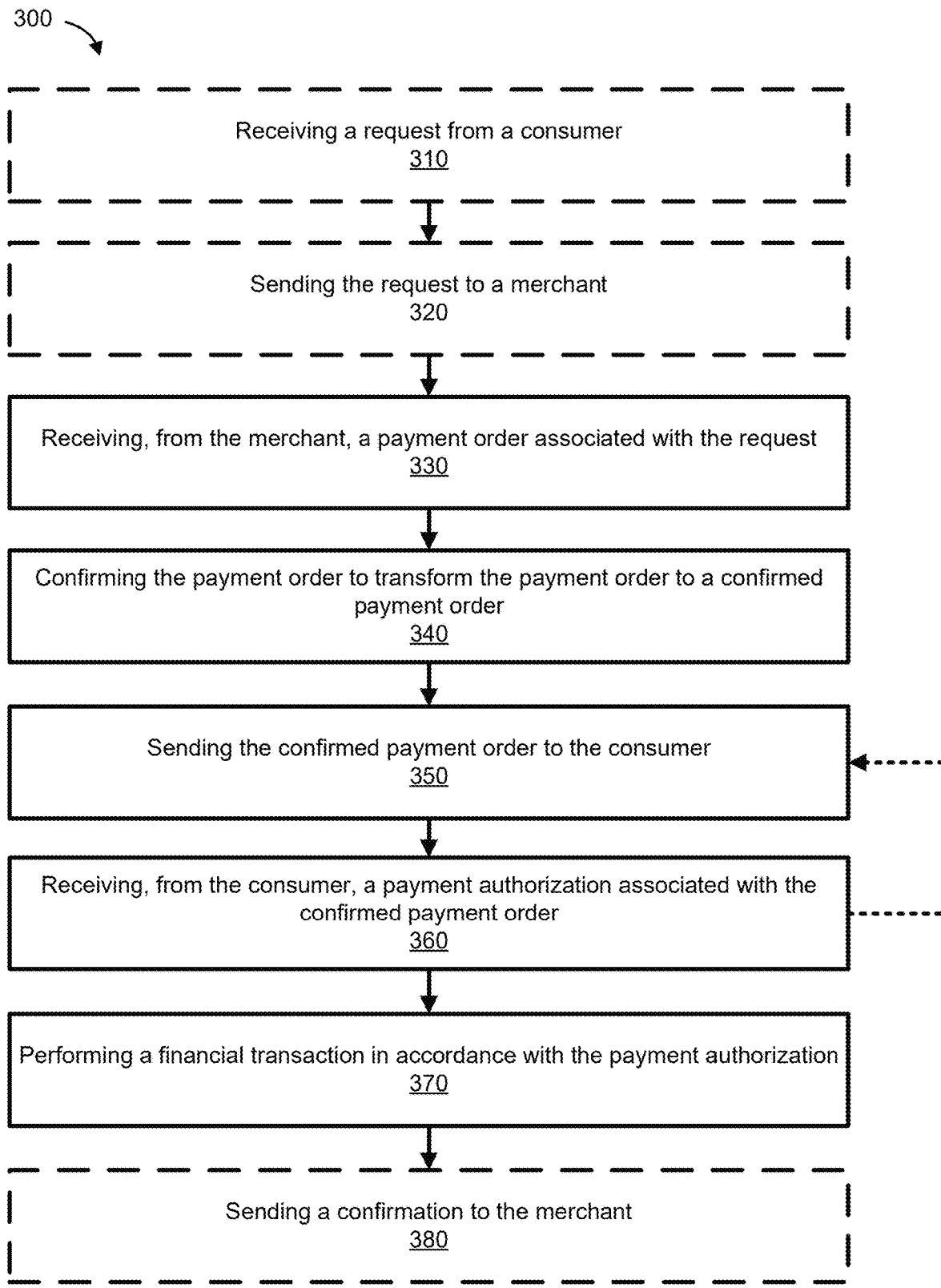
FIG. 3A is a flow diagram illustrating an example method according to exemplary embodiments of the present technology.

FIG. 3A is a flow diagram illustrating an example method according to exemplary embodiments of the present technology. Optional steps are shown with dashed lines. FIG. 3A illustrates a method 300 for conducting a secure transaction over a network. In various embodiments, method 300 is performed by a computing system, as described in relation to FIG. 5. At step 310, a request from a consumer is received. At step 320, the request to a merchant is sent. At step 330, a payment order associated with the request is received from the merchant. At step 340, the payment is confirmed in order to transform the payment order to a confirmed payment order. At step 350, the confirmed payment order to the consumer is sent to a consumer. In various embodiments the consumer may be a third-party entity. At step 360, a payment authorization associated with the confirmed payment order is received from the user. At step 370, a financial transaction in accordance with the payment authorization is performed. At step 380, a confirmation is sent to the merchant. In various embodiments, the confirmation is a confirmation of payment and once the merchant receives the confirmation of payment from the consumer, the merchant delivers the item and/or performs the requested service. Then the merchant issues a receipt to the consumer.

The method 300 illustrated in FIG. 3A may also be adapted to the case of sending money securely. In the money transfer use case, a consumer can initiate the transaction by inputting a merchant identifier into the consumer application, and sending a payment request to the system. In this manner, a consumer may send a payment to a friend or relative via the merchant. In still further alternatives, a shopping cart may enable direct shopping by the consumer, and also enable a merchant to maintain stock inventory.

Figure 3B:
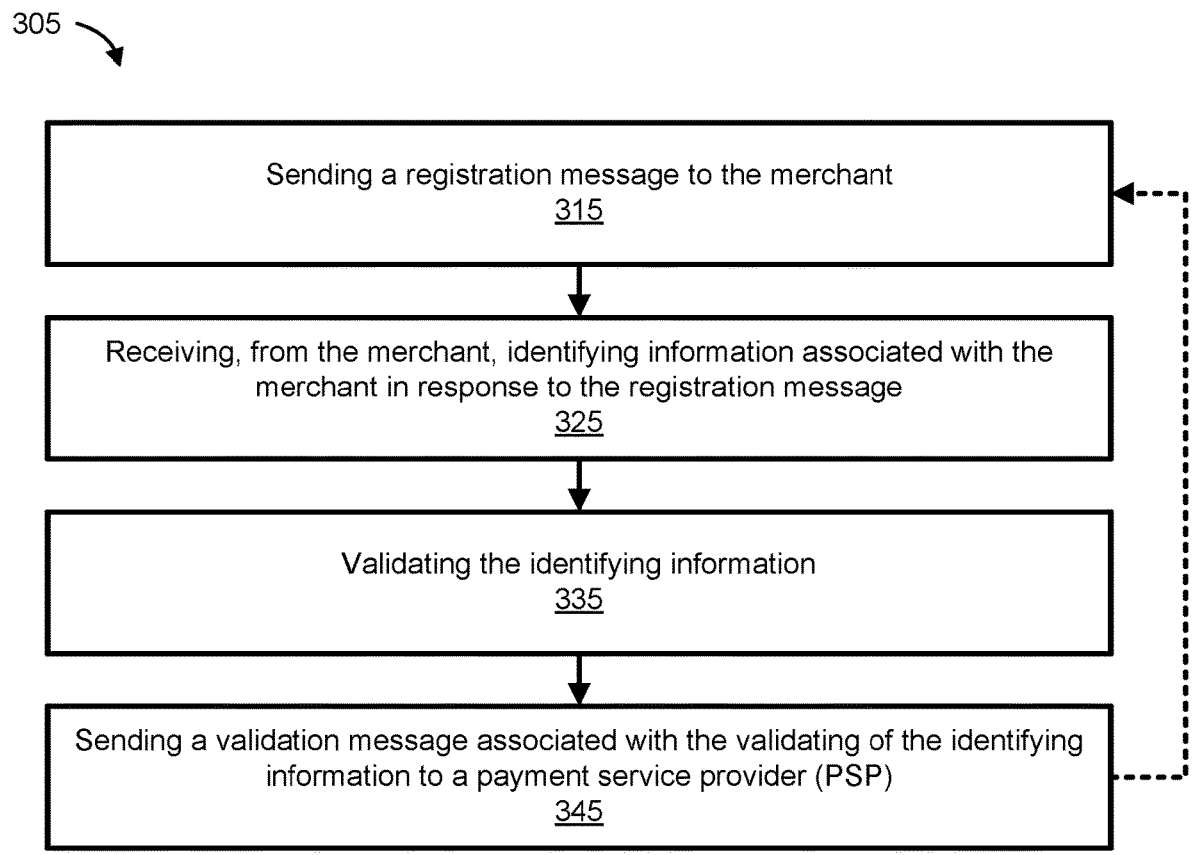
FIG. 3B is a flow diagram illustrating an exemplary method according embodiments of the present technology.

FIG. 3B is a flow diagram illustrating an exemplary method according embodiments of the present technology. FIG. 3B illustrates a method 305 that comprises additional steps that may be performed for conducting a secure transaction over a network. In various embodiments, method 305 is performed by a computing system, as described in relation to FIG. 5. At step 315, a registration message is sent to the merchant. At step 325, identifying information associated with the merchant in response to the registration message is received from the merchant. At step 335, the identifying information is validated. At step 345, a validation message associated with the validating of the identifying information is sent to a payment service provider (PSP).

Figure 4:
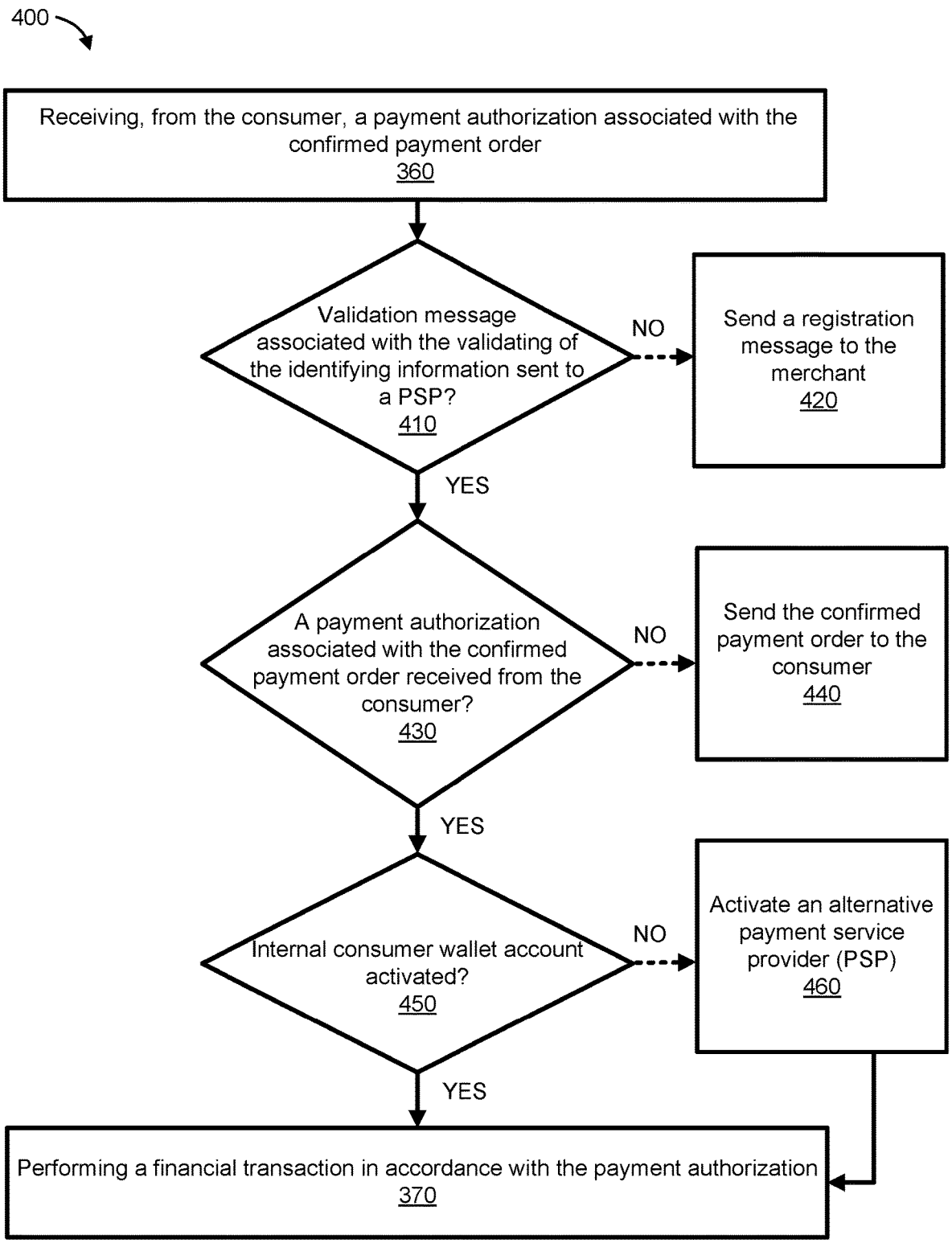
FIG. 4 is a flow diagram showing a further example according to exemplary embodiments of the present technology.

FIG. 4 is a flow diagram showing a further example method according to exemplary embodiments of the present technology, and in particular shows greater detail related to steps 360 and 370 shown in FIG. 3A. According to some embodiments, FIG. 4 illustrates a method 400 for performing a transaction in accordance with the payment authorization. In some embodiments, FIG. 4 illustrates an algorithm of a means for performing a transaction in accordance with the payment authorization. In various embodiments, method 400 is performed by a computing system, as described in relation to FIG. 5. At step 360, a payment authorization associated with the confirmed payment order is received from the consumer. At step 410, a decision is made whether a validation message associated with the validating of the identifying information has been sent to a PSP. If no, at step 420, a registration message is sent to the merchant. If yes, at step 430, a decision is made whether a payment authorization associated with the confirmed payment order has been received from the consumer. If no, at step 440, the confirmed payment order is sent to the consumer. If yes, at step 450, a decision is made whether an internal consumer wallet account is activated. If no, at step 460, an alternative PSP is activated. If yes, at step 370, a financial transaction in accordance with the payment authorization is performed. Step 370, a financial transaction in accordance with the payment authorization is performed may also be performed after step 460.

It will be understood that the functionalities described herein, which are attributed to the system 100 may also be executed within a client. That is, a client may be programmed to execute the functionalities described herein. In other instances, the system 100, and a client may cooperate to provide the functionalities described herein, such that a client is provided with a client-side application that interacts with the system 100 such that the system 100 and a client operate in a client/server relationship. Complex computational features may be executed by the gateway server(s) 170, while simple operations that require fewer computational resources may be executed by a client, such as data gathering and data display.

In general, a user interface module may be executed by the system 100 to provide various programmable user interfaces such as a graphical user interfaces (GUIs) that allow consumers or merchants to interact with the system 100. In some instances, GUIs are generated by execution of an application itself. Consumers may interact with the system 100 using, for example, a client. The system 100 may generate web-based interfaces for a client. The system 100 is generally referred to herein as "Payit system" and/or "Payit services"

In various embodiments, the present technology is a system delivery specification. Exemplary mobile payment systems and applications for consumers and merchants are described below. Exemplary GUIs include the Payit Home Screen comprising the following main icons: MyPayit, Services, Loyalty Cards, Merchants, We Listen, Language Switcher, Quick Help Tour, and Countries.

In some embodiments, the MyPayit icon includes MyOrders. MyOrders is part of MyPayit that allows the consumers or merchants to: activate their account, view their account balance, add funds from different sources to their account, and instantly make transactions with Payit services rather than filling out debit/credit card details for every transaction. For instance, a consumer may make a request for product or a service from a merchant. In response to the request for the product or the service, the merchant sends the consumer a purchase order for each request. The purchase order may be an invoice, bill of sale, account statement, and the like. MyOrders is incoming purchase orders from different merchants in response to requests for products or services by the consumer. The consumer may accept the purchase order and process payment for the purchase order. Alternatively, the consumer may reject the purchase order. For example, MyOrders is a solution for parents to approve payments for purchases made by their children at school. For instance, a child can make a purchase at school using the Payit system and a parent can remotely approve the purchase using the Payit system. MyOrders may be associated with a single consumer with a master account and that oversees multiple payments for multiple accounts using a single payment processing point.

According to various embodiments, MyOrders is an inbox holding all the details of all pending purchase orders. The pending purchase orders are categorized with the order status, such as order pending or order already paid. For example, the details of the purchase orders include: merchant name, order number, representation of the product or service, price or the product or service, quantity, and the like. A consumer may select a particular pending purchase order to view the details of that particular pending purchase order. Additionally, consumers can share the details of their purchase order with other consumers using social media, messaging, and the like.

In some embodiments, the scope within the Payit system includes the following on the merchant interface side (e.g. merchant application 120) and the consumer interface side (e.g. consumer application 110). The merchant interface side includes a Payit interface and/or a third-party interface. Both the Payit interface and the third-party interface include: a regular Point of Sale (POS), a Payit merchant, and/or any additional applications from any source operator. The consumer interface side includes an internal consumer wallet and/or a third-party wallet, and/or a direct bank account interface.

In various embodiments, the merchant interface and the consumer interface communicate with high security through the cloud. For example, communications are hashed with public and private keys management. The purchase orders are sent to account specific numbers. For example, payment orders are sent via a Mobile Station International Subscriber Directory Number (MSISDN), email Identification, a verification code, and the like. Bilateral communication between the merchant interface and the consumer interface may be through a network as described herein.

In some embodiments, the processing of purchase orders follows the following flow depending on whether the consumer and/or the merchant have a PSP activated. If the consumer and/or the merchant do not have a PSP activated, an activation message is sent to the consumer and/or to the merchant. If the consumer and merchant have a PSP activated, the flow depends on which payment system the consumer and merchant have activated, such as: an internal consumer wallet account (e.g. "Payit Wallet"), a third-party wallet, and/or a direct bank account access. If the consumer and the merchant both have a Payit Wallet, transaction flow results in credit value moving from the consumer wallet account to the merchant wallet account instantly. If consumer and/or merchant wallet do not have a Payit Wallet then the transaction will be completed using an alternative PSP (e.g. the third-party wallet or the direct bank account access). For instance, if the consumer and/or the merchant do not both have a Payit Wallet, the merchant account must be activated. Transaction flow results in credit value added to the merchant wallet account as soon as the issuer of the third-party wallet responds to a payment request. For example, if the consumer account and/or the merchant account include a direct bank account access, a merchant wallet account must be activated. Transaction flow results in credit value added to the merchant wallet as soon as the issuer of the consumer bank account responds to a payment processing request.

In various embodiments, "one-in" activation enables consumers to have one-time activation of accounts. For example, consumers activate the MyPayit system with their mobile number. Payit consumers are sent email verification, and the email will be used for future communications between the Payit system and consumers. Additionally, a consumer password is established with secondary authentication by the consumer email and or mobile number. For instance, authentication by mobile number is completed by an activation code delivered via a text message. In some instances, if the consumer does not respond to the activation within five minutes the activation code expires and must be resent.

In some embodiments, after "one-in" is activated, consumers can view the MyPayit home page that includes account balances and recent transactions of the consumer. The account balance may be a single account balance that can be used to pay any merchant for any product or service. Additionally, recent transactions of the consumer are displayed below the account balance. MyPayit alerts consumers when their account balance falls below a threshold. For example, the MyPayit Homepage sends a push notification to a consumer when the account balance falls below the threshold. For instance, when the account balance of a consumer reaches or is below a consumer selected threshold, MyPayit sends the consumer an alert. A consumer may add funds to their account balance from multiple sources such as a credit/debit card, voucher, gift card, or loyalty card by clicking on an "Add Funds" button on the MyPayit Homepage.

In various embodiments, the merchant catalog includes the following. From the consumer perspective (e.g. GUIs coupled with consumer application 110), a consumer selects the merchant icon to display merchants with available items. A consumer can select to display the merchants by name and/or by category of goods. For example, the category of goods may include: Automotive, Business Supplies, Electronics, Education, Entertainment, Food and Dining, and Health/Medicine. The consumer can select their desired category of goods and view all the merchants that sell goods classified in that category. Each merchant displays the number of in-stock items in the selected category. The merchant side (e.g. GUIs coupled with merchant application 120) allows the merchant to update the status of the goods in real-time.

According to various embodiments, the consumer and the merchant interact by the consumer "virtual shopping" in the merchant store. For example, the merchant adds items using the Payit system to their merchant store. The consumer requests an item by selecting a "Request button" for the item of interest in the merchant store. The merchant receives the request in the merchant side that enables the merchant to accept or to reject the consumer request for the item. The consumer instantaneously receives a notification if the merchant accepts the consumer request. Upon acceptance of the consumer request, the Payit system sends a payment request to the consumer. The consumer can reject or pay the payment request from the merchant. If the consumer accepts the payment request the merchant receives a payment confirmation. Once the merchant receives confirmation of payment from the consumer, the merchant delivers the item and issues a receipt to the consumer.

In some embodiments, the Payit system includes the following parties: Payit platform, consumers, financial institutions, merchant retailers, billers and service providers, and governments. The Payit platform features include: an administrative panel for managing Payit services, account access privileges for the affiliated team and dealers, multiple delivery options across multiple channels, centralized back-to-back services integration, automated processing for different methods of payment, Payit compatibility for all transactions with all devices and operating systems, and real-time payment. Payit includes the following functionalities for consumers: choice of multiple funding sources, secure access to trusted funding-sources, a single screen for quick access to selection buttons, real-time access to services, multiple language options with localized language use, and overall system that is intuitive, easy-to-use, and always available. Payit functionalities for financial institutions include: new revenue streams, an efficient payment process, decreased/controlled risk, consumer protection with a verified Know Your Consumer (KYC) policies. A bank account of a consumer remains the center for funding. Payit functionality for merchant retailers include: a mobilized inventory system, scalability to match products of a merchant, decreased cost to complete business, and secure instant invoicing that results in reliable payment. Payit functionality for billers and service providers include: decreased costs, minimal service charges, invoice collection in real-time before product delivery, strong consumer relationships, and ability to reach new consumers. Payit features for governments include: a simple payment process, increased consumer choice, decreased risk for regulation and money pools, and improving the daily life of individuals.

According to various embodiments, the following are the transaction flows of functionality enabled by the Payit system for consumers requesting items from a merchant catalog (consumer purchasing), merchants sending orders to consumers (merchant pushing), consumer transacting with another consumer (peer-to-peer transactions), and integration of third-parties (non-Payit merchant or consumer) with the Payit system (third-party merchant requests). Closed loop transaction flows are between Payit wallet consumer. For example, consumer purchasing and merchant pushing are closed loop transactions when both the merchant and the Payit consumer utilize the Payit wallet for the transaction. Open loop transaction flows include a third-party wallet. For example, an open-loop transaction between a consumer with a Payit Wallet and a consumer with a third-party wallet, or between two consumers that both have third-party wallets. The Payit system acts as the processor of the transaction between the two consumers users.

Figure 5:
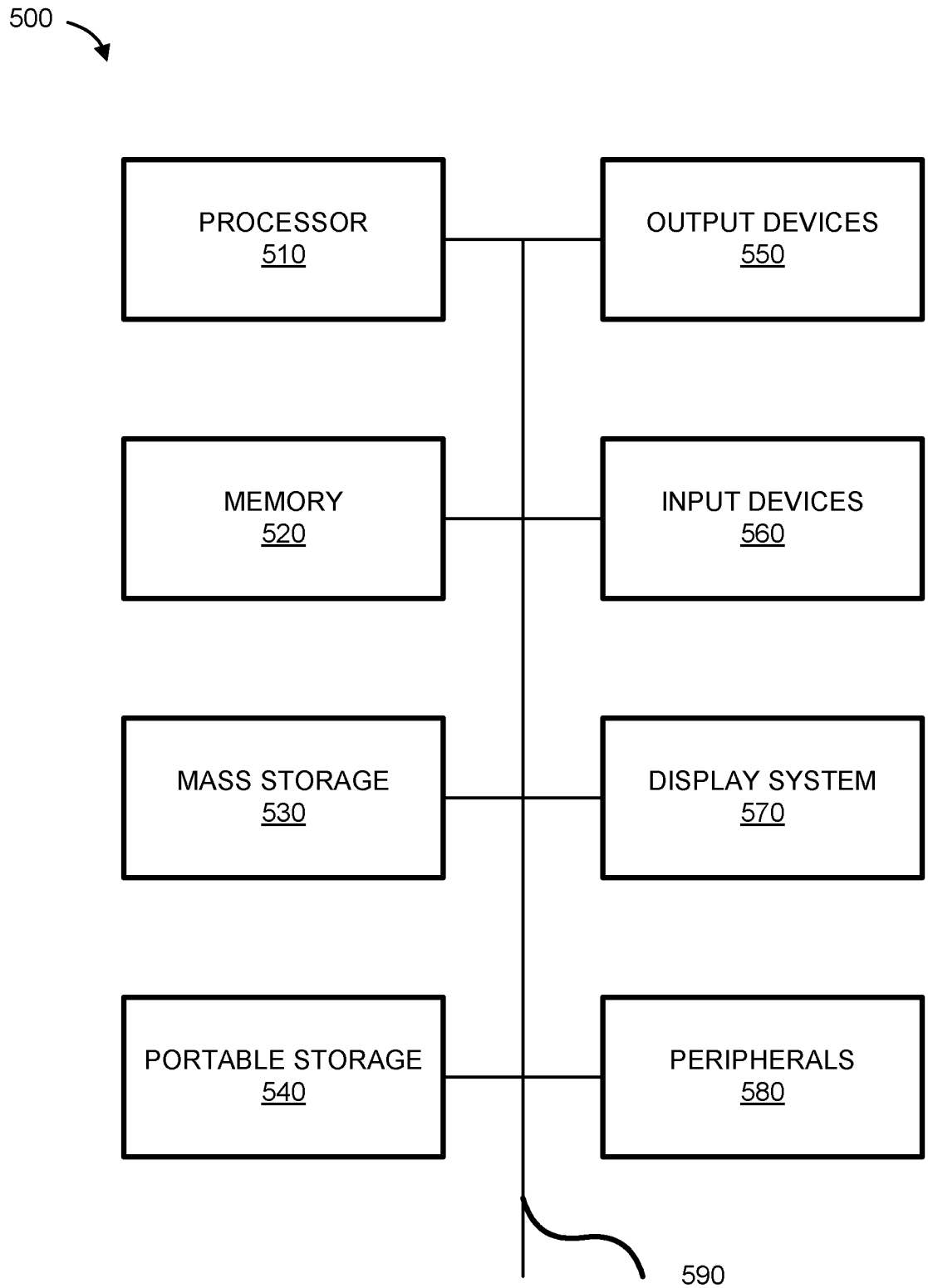
FIG. 5 illustrates a computer system according to exemplary embodiments of the present technology.

FIG. 5 illustrates an exemplary computer system 500 that may be used to implement some embodiments of the present invention. The computer system 500 in FIG. 5 may be implemented in the contexts of the likes of computing systems, networks, servers, or combinations thereof. The computer system 500 in FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 in FIG. 5 further includes a mass data storage 530, portable storage device 540, output devices 550, consumer input devices 560, a graphics display system 570, and peripheral device(s) 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 in FIG. 5. The system software for implementing embodiments of the present disclosure is stored on such a portable medium and input to the computer system 500 via the portable storage device 540.

User input devices 560 can provide a portion of a user interface. Consumer input devices 560 may include one or more microphones, an alphanumeric keypad, such as a keyboard, for inputting alphanumeric and other information, or a pointing device, such as a mouse, a trackball, stylus, or cursor direction keys. Consumer input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system 500.

The components provided in the computer system 500 in FIG. 5 are those typically found in computer systems that may be suitable for use with embodiments of the present disclosure and are intended to represent a broad category of such computer components that are well known in the art. Thus, the computer system 500 in FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside consumers who deploy applications within the computing infrastructure to obtain the benefit of large computational or storage resources.

The cloud is formed, for example, by a network of web servers that comprise a plurality of computing devices, such as the computer system 500, with each server (or at least a plurality thereof) providing processor and/or storage resources. These servers manage workloads provided by multiple consumers (e.g., cloud resource consumers or other consumers). Typically, each user places workload demands upon the cloud that vary in real-time, sometimes dramatically. The nature and extent of these variations typically depends on the type of business associated with the consumer.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ and the like and conventional procedural programming languages, such as the "C" programming language or similar programming languages. The program code may execute entirely on the consumer's computer, partly on the consumer's computer, as a stand-alone software package, partly on the consumer's computer and partly on a remote computer or entirely on the remote computer or server. In the latter scenario, the remote computer may be connected to the consumer's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A non-transitory computer-readable storage medium having embodied thereon a program, the program being executable by a processor to perform a method for conducting a secure transaction over a network, the method comprising:
    sending a registration message to a merchant;
    receiving, from the merchant, identifying information associated with the merchant in response to the registration message;
    validating the identifying information;
    sending a validation message associated with the validating of the identifying information to either: an external payment service provider (PSP), or the PSP being an internal consumer wallet account;
    receiving a request from a consumer;
    sending the request to the merchant;
    receiving, from the merchant, a payment order associated with the request and including a unique identifier, the payment order being received via a merchant programmable user interface, wherein the merchant programmable user interface is configured to perform: managing a profile of the merchant; managing a definition of a product; managing an inventory of the product; managing a location of the product; managing agents of the merchant; contacting a support system about the merchant; communicating with a product catalog of the merchant; communicating with an inventory system of the merchant; communicating with a product information management system of the merchant; updating inventory of the merchant based on the request; communicating with a third-party product catalog; communicating with a third-party inventory system; and communicating with a third-party product information management system;

confirming the payment order to transform the payment order to a confirmed payment order;

sending the confirmed payment order to a consumer;

receiving, from the consumer, a payment authorization associated with the confirmed payment order, the payment authorization being received via a consumer programmable user interface, the payment authorization from the consumer comprising: a secure, encrypted, Internet Protocol (IP) message using encryption hashed with public and private key management; and performing a transaction in accordance with the payment authorization, the performing of the transaction in accordance with the payment authorization using a secure internal switch and being associated with the internal consumer wallet account, the internal consumer wallet account being associated with an account of the consumer; and the account of the consumer being at least one of: a credit account, a debit account, a savings account, a loyalty account, and a virtual currency account.

2. The non-transitory computer-readable storage medium of claim 1, wherein the merchant programmable user interface is coupled with a mobile Points Of Sale (mPOS) terminal, the merchant programmable user interface configured to perform:

registering the terminal;
managing the terminal;
authorizing a payment from one of the internal consumer wallet account or the external PSP to the merchant;
preauthorizing the payment from one of the internal consumer wallet account or the external PSP;
voiding the payment from one of the internal consumer wallet account or the external PSP;
refunding the payment from one of the internal consumer wallet account or the external PSP; and
settling the payment from one of the internal consumer wallet account or the external PSP.

3. The non-transitory computer-readable storage medium of claim 1, wherein at least one of the payment order, the confirmed payment order, and the encrypted payment authorization is encrypted using a secure, encrypted, Internet Protocol (IP) message using encryption hashed with public and private key management.

4. The non-transitory computer-readable storage medium of claim 1, wherein the validation message is sent to the external PSP and the performing of the transaction is associated with the external PSP, the external PSP being is at least one of: a credit account, a bank account, and a third-party PSP.

5. The non-transitory computer-readable storage medium of claim 1, wherein the unique identifier is at least one of a mobile telephone number and an email address.

6. The non-transitory computer-readable storage medium of claim 1, further comprising sending, to the consumer and the merchant, one or more payment confirmations associated with the performing of the transaction in accordance with the payment authorization.

7. A non-transitory computer-readable storage medium having embodied thereon a program, the program being executable by a processor to perform a method for conducting a secure transaction over a network, the method comprising:

sending a registration message, by one or more gateway servers of a system, to a prospective merchant;

in response to the registration message, receiving, by the one or more gateway servers of the system and from the prospective merchant, identifying information associated with the prospective merchant;

validating, by the one or more gateway servers of the system, the identifying information;

sending, by the one or more gateway servers of the system and via a secure switch of the system, a validation message associated with the validating of the identifying information to at least one payment service provider (PSP);

converting, by the one or more gateway servers of the system, the prospective merchant to a participating merchant after the validating;

exchanging, by the one or more gateway servers of the system, cryptographic information with the participating merchant;

receiving, by the one or more gateway servers of the system and from the participating merchant, an encrypted payment order associated with a request from a consumer, the encrypted payment order being received via a merchant programmable user interface and including a unique identifier, wherein the merchant programmable user interface is configured to perform:
managing a profile of the participating merchant;
managing a definition of a product;
managing an inventory of the product;
managing a location of the product;
managing agents of the participating merchant;
contacting a support system about the participating merchant;
communicating with a product catalog of the participating merchant;
communicating with an inventory system of the participating merchant;
communicating with a product information management system of the participating merchant;
updating inventory of the merchant based on the request;
communicating with a third-party product catalog;
communicating with a third-party inventory system; and
communicating with a third-party product information management system;

confirming, by the one or more gateway servers of the system, the encrypted payment order to transform the encrypted payment order to a decrypted confirmed payment order, the confirming of the payment order including decrypting the encrypted payment order and validating the participating merchant;

sending, by the one or more gateway servers of the system, the confirmed payment order to a mobile device, the confirmed payment order being encrypted to form an encrypted confirmed payment order;

receiving, by the one or more gateway servers of the system from the mobile device, an encrypted payment authorization associated with the confirmed payment order, the encrypted payment authorization identifying the at least one PSP;

performing, by the one or more gateway servers of the system and via the secure switch, a transaction with the at least one PSP in accordance with the encrypted payment authorization;

signing and/or authenticating, by the secure switch of the system, one or more messages communicated between the one or more gateway servers and the at least one PSP;

applying, by the secure switch of the system, one or more business rules to the one or more messages communicated between the one or more gateway servers and the at least one PSP, wherein the one or more messages include the validation message sent and any other message involved in the performing of the transaction; and instructing the participating merchant to fulfill the request of the consumer.

8. The non-transitory computer-readable storage medium of claim 7, wherein at least one of the encrypted payment order, the encrypted confirmed payment order, and the encrypted payment authorization is encrypted using a secure, encrypted, Internet Protocol (IP) message using encryption hashed with public and private key management.

9. The non-transitory computer-readable storage medium of claim 7, wherein the performing of the transaction is associated with the at least one PSP, the at least one PSP being at least one of: a credit account, a bank account, and a third-party PSP.

10. The non-transitory computer-readable storage medium of claim 7, wherein the unique identifier is at least one of a mobile telephone number and an email address.

11. The non-transitory computer-readable storage medium of claim 7, wherein:
the at least one PSP is an internal consumer wallet account; and
the performing of the transaction uses a secure internal switch and is associated with the internal consumer wallet account, the internal consumer wallet account being associated with an account associated with the mobile device, and the account being at least one of: a credit account, a debit account, a savings account, a loyalty account, and a virtual currency account.

12. The non-transitory computer-readable storage medium of claim 7, further comprising sending, to the consumer and the participating merchant, one or more payment confirmations associated with the performing of the transaction in accordance with the encrypted payment authorization.

13. The non-transitory computer-readable storage medium of claim 7, wherein the merchant programmable user interface is coupled with a mobile Points Of Sale (mPOS) terminal, the merchant programmable user interface configured to perform at least one of:
registering the terminal; and
managing the terminal.

14. A method for conducting a secure transaction over a network using one or more gateway servers, the method comprising:
establishing a product inventory received from a merchant mobile application;
receiving a request for a product within the product inventory from a consumer using a consumer mobile application;
receiving a cryptogram that comprises an amount for the product and an account identifier for the consumer;
validating the merchant by decrypting the cryptogram;
transmitting a signed cryptographic order from the merchant mobile application via a merchant programmable user interface to the consumer mobile application, wherein the merchant programmable user interface is configured to perform:
managing a profile of the merchant;
managing a definition of the product;
managing an inventory of the product;
managing a location of the product;
managing agents of the merchant;
contacting a support system about the merchant;
communicating with a product catalog of the merchant;
communicating with an inventory system of the merchant;
communicating with a product information management system of the merchant;
updating inventory of the merchant based on the request;
communicating with a third-party product catalog;
communicating with a third-party inventory system; and
communicating with a third-party product information management system; and
processing a cryptogram payment authorization from the consumer using a payment switch.

15. The method of claim 14 wherein the processing of the cryptogram payment authorization from the consumer using the payment switch executes as a single atomic transaction between the consumer and the merchant.

16. The method of claim 15 further comprising: sending a confirmation to the merchant and to the consumer in response to the single atomic transaction between the consumer and the merchant.

17. The method of claim 14 wherein the product inventory is linked to a predetermined, selectable threshold; and
the method further comprises making a new order to a supplier in response to the product inventory dropping below the predetermined, selectable threshold.

18. The method of claim 14 further comprising managing a location of the product inventory.

19. The method of claim 14 wherein the communicating with a third-party product catalog further comprises receiving a user selection to display merchants by name via a graphical user interface.

* * * * *